(12) United States Patent
Hildrum et al.

(10) Patent No.: US 8,595,732 B2
(45) Date of Patent: Nov. 26, 2013

(54) REDUCING THE RESPONSE TIME OF FLEXIBLE HIGHLY DATA PARALLEL TASK BY ASSIGNING TASK SETS USING DYNAMIC COMBINED LONGEST PROCESSING TIME SCHEME

(75) Inventors: Kirsten W. Hildrum, Hawthorne, NY (US); Rohit M. Khandekar, Hawthorne, NY (US); Vibhore Kumar, Hawthorne, NY (US); Sujay S. Parekh, Hawthorne, NY (US); Deepak Rajan, Hawthorne, NY (US); Joel L. Wolf, Hawthorne, NY (US); Kun-Lung Wu, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/946,475

(22) Filed: Nov. 15, 2010

(65) Prior Publication Data
US 2012/0110047 A1    May 3, 2012

(51) Int. Cl.
*G06F 15/16* (2006.01)
(52) U.S. Cl.
USPC ............ 718/102; 718/103; 718/104; 709/201
(58) Field of Classification Search
USPC ........................... 718/102, 103, 104; 709/201
See application file for complete search history.

(56) References Cited

U.S. PATENT DOCUMENTS

| | | | |
|---|---|---|---|
| 6,199,093 B1 | 3/2001 | Yokoya | |
| 7,207,043 B2 * | 4/2007 | Blythe et al. | 718/104 |
| 7,523,123 B2 * | 4/2009 | Yang et al. | 1/1 |
| 7,526,767 B1 * | 4/2009 | Rhee et al. | 718/104 |
| 7,559,062 B2 * | 7/2009 | Code et al. | 718/104 |
| 7,574,424 B2 | 8/2009 | Chowdhuri | |
| 7,590,620 B1 | 9/2009 | Pike et al. | |
| 7,650,331 B1 | 1/2010 | Dean et al. | |
| 7,912,623 B2 * | 3/2011 | Sugiyama et al. | 701/103 |
| 7,958,507 B2 * | 6/2011 | Santos et al. | 718/102 |
| 8,150,889 B1 * | 4/2012 | Bacthavachalu et al. | 707/802 |
| 2006/0288346 A1 * | 12/2006 | Santos et al. | 718/102 |
| 2008/0235697 A1 * | 9/2008 | Kobayashi | 718/103 |
| 2009/0025003 A1 * | 1/2009 | Rai | 718/102 |
| 2009/0254913 A1 * | 10/2009 | Kawano et al. | 718/103 |

OTHER PUBLICATIONS

Vikram-et al.; Mapping Data-Parallel Tasks onto Partially Reconfigurable Hybrid Processor Architectures; Inspec/IEEE; Sep. 2006, pp. 1010-1023.
Gonzalez-et al.; "Minimizing Total Completion Time on Uniform Machines With Deadline Constraints"; DIALGO/CSA; 2006, pp. 95-115.
Singh-et al.; "Workflow Task Clustering for Best Effort Systems with Pegasus"; ACM Digital Library; Jan.-Feb. 2008, pp. 1-8.
Silberstein-et al.; "GridBot: Execution of Bags of Tasks in Multiple Grids"; ACM Digital Library; Nov. 2009, pp. 1-12.
John Turek, et al., "Approximate Algorithms for Scheduling Parallelizable Tasks," ACM Digital Library, 1992, pp. 323-332.

* cited by examiner

*Primary Examiner* — Meng An
*Assistant Examiner* — Abu Ghaffari
(74) *Attorney, Agent, or Firm* — F. Chau & Associates, LLC

(57) ABSTRACT

A method for scheduling a data processing job includes receiving the data processing job formed of a plurality of computing units, combining the plurality of computing units into a plurality of sets of tasks, each set including tasks of about equal estimated size, and different sets having different sized tasks, and assigning the tasks to a plurality of processors using a dynamic longest processing time (DLPT) scheme.

15 Claims, 4 Drawing Sheets

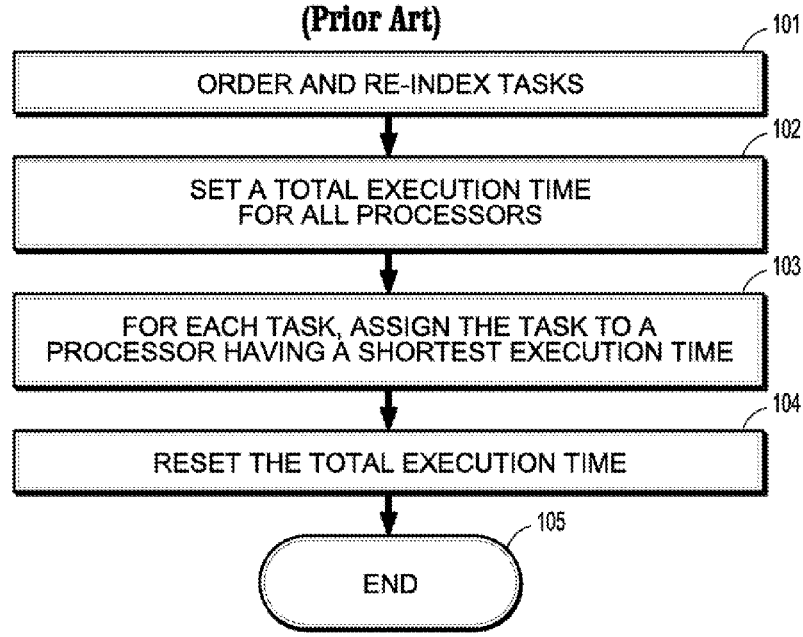
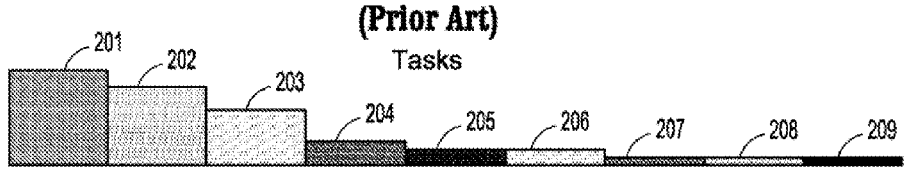
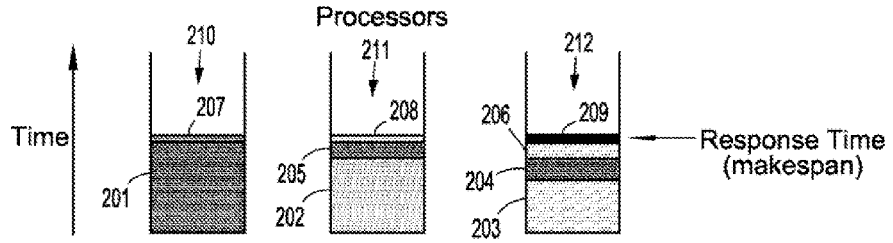

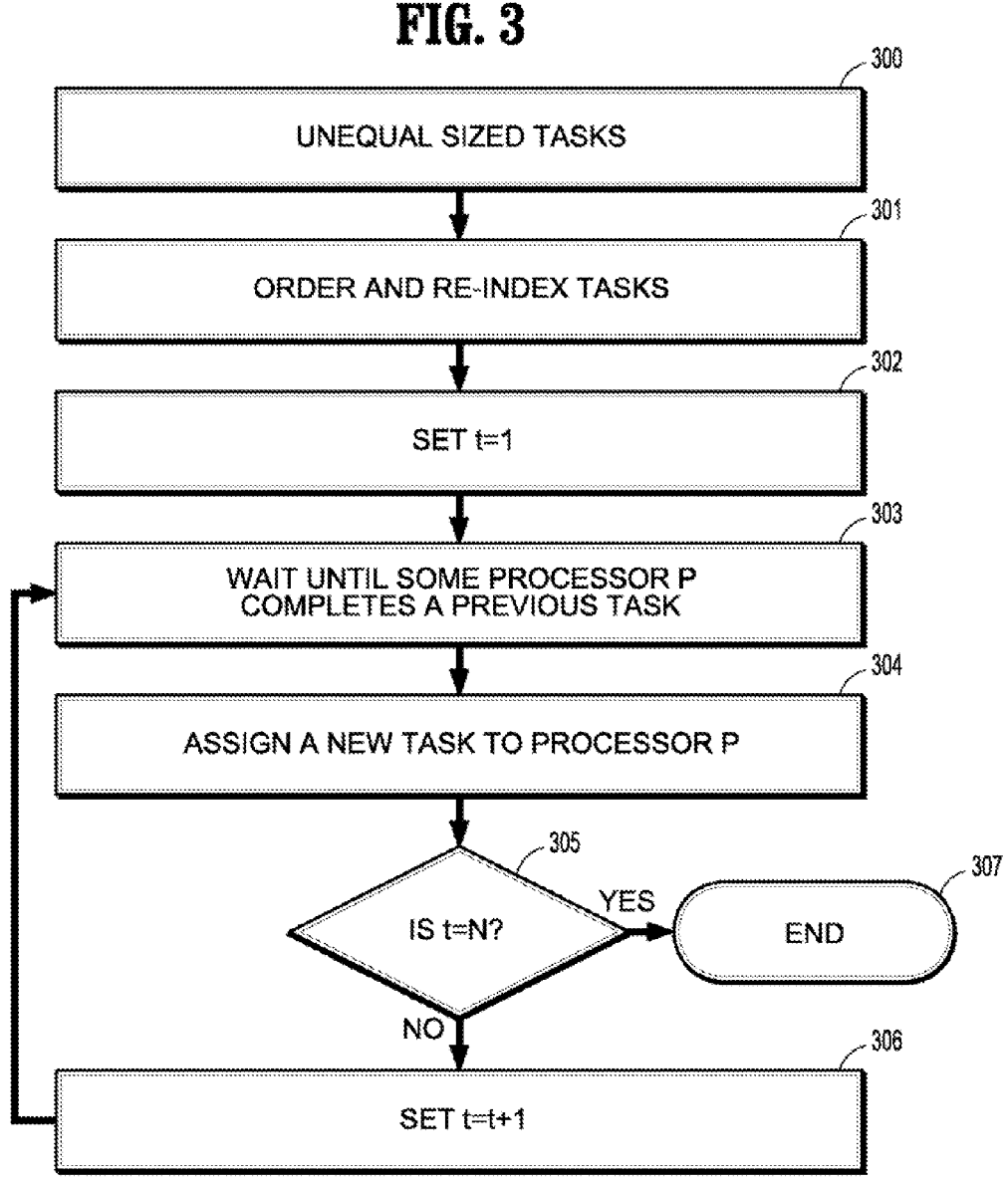

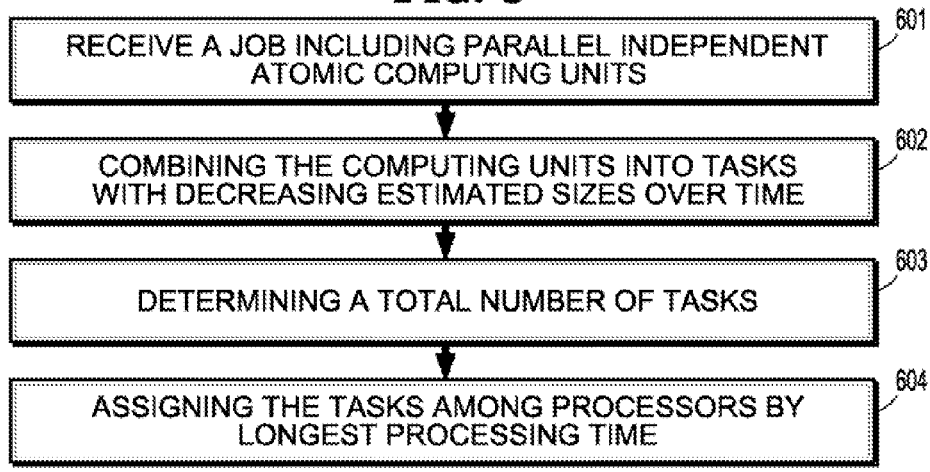
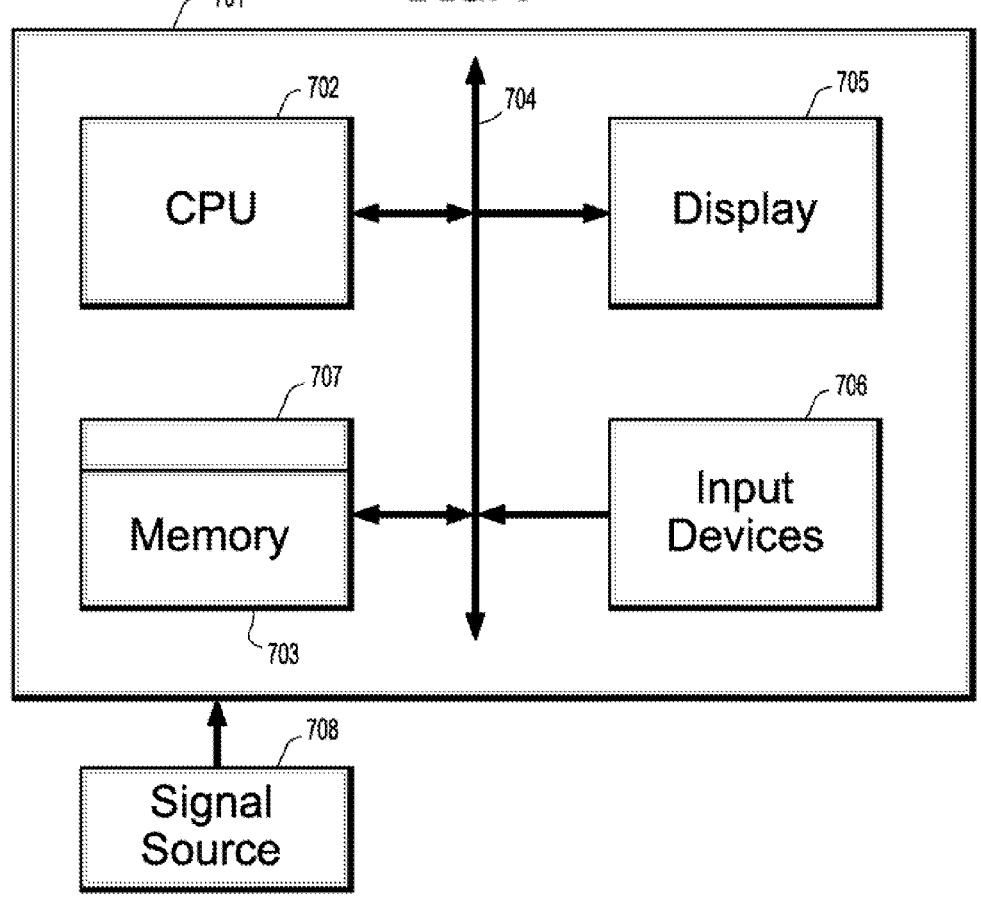

REDUCING THE RESPONSE TIME OF FLEXIBLE HIGHLY DATA PARALLEL TASK BY ASSIGNING TASK SETS USING DYNAMIC COMBINED LONGEST PROCESSING TIME SCHEME

STATEMENT REGARDING FEDERALLY SPONSORED RESEARCH OR DEVELOPMENT

This invention was made with Government support under Contract No.: H98230-07-C-0383 awarded by the United States Department of Defense. The Government has certain rights in this invention.

BACKGROUND

1. Technical Field

The present disclosure generally relates to supporting the completion of a job comprising highly data parallel tasks.

2. Discussion of Related Art

Consider an environment in which one or more jobs can be decomposed into tasks to be scheduled on a plurality of processors. A group of such processors is referred to as a cluster. The assignment of these tasks is typically controlled by a scheduler. In the case of a single job, the scheduler typically assigns the corresponding tasks to the processors in a manner such that the last task completes as quickly as possible. The job is understood to be complete at the time that the last task completes. One proposed method of assignment assigns the tasks to processors in a manner such that the last tasks to complete on each processor complete at about the same time. In the case of multiple jobs, the scheduler assigns each task of a given job in a manner such that the last tasks of a given job to complete on each assigned processor at about the same time.

MapReduce is a framework for processing large datasets (e.g., terabytes of data) involving distributable problems using a large number of commodity hosts (e.g., thousands of computers or nodes). Processing can occur on data stored either in a filesystem (unstructured) or within a database (structured). The MapReduce framework is designed to be parallelized automatically. It can be implemented on large clusters, and it inherently scales well. Scheduling, fault tolerance and communications are all handled automatically, without direct user assistance.

MapReduce jobs include two processing phases, a Map page and a Reduce phase. Each phase is broken into multiple independent tasks, the nature of which depends on the phase. In the Map phase the tasks include the steps of scanning and processing in order to extract information from equal-sized blocks of input data. Each block is typically replicated on disks in three separate racks of hosts (in Hadoop, for example, using the HDFS file system). The output of the Map phase is a set of key-value pairs. These intermediate results are also stored on disk. Each of the Reduce phase tasks corresponds to a partitioned subset of the keys of the intermediate results. There is a shuffle step in which all relevant data from all Map phase output is transmitted across the network, a sort step, and a processing step, which may include transformation, aggregation, filtering and/or summarization.

There is a scheduler in MapReduce that handles the Map phase tasks of a job, and likewise a scheduler in MapReduce that handles the Reduce phase tasks of a job. There exist a number of scheduling schemes for MapReduce work, including FAIR and FLEX. As described below, FAIR is one component layer in the full Hadoop Fair Scheduler (HFS). FLEX is a potential replacement to FAIR, having apparently better performance and the ability to optimize to specific scheduling metrics.

HFS can be said to include two hierarchical algorithmic layers, which will be called the allocation layer and the assignment layer.

Referring to the allocation layer, each host is assumed to be capable of simultaneously handling some maximum number of Map phase tasks and some maximum number of Reduce phase tasks. These are the number of Map slots and Reduce slots, respectively. Typically a host has two Map slots per core, and two Reduce slots per core. Aggregating these slots over all the hosts in the cluster, the total number of Map slots, and similarly the total number of Reduce slots may be determined. The role of the allocation layer scheme is to partition the number of Map slots among the active Map jobs in some intelligent manner, and similarly the number of Reduce slots among the active Reduce jobs. The node that produces these allocations is known as the master. The present HFS allocation layer is referred to as FAIR.

Referring to the assignment layer, it is this layer that makes the actual job task assignment decisions, attempting to honor the allocation decisions made at the allocation level to the extent possible. Host slaves report any task completions at heartbeat epochs (e.g., on the order of a few seconds). Such completions free up slots, and also incrementally affect the number of slots currently assigned to the various jobs. The current slot assignment numbers for jobs are then subtracted from the job allocation goals. This yields an effective ordering of the jobs, from most relatively under allocated to most relatively over allocated. For each currently unassigned slot, the HFS assignment model then finds an "appropriate" task from the most relatively under allocated job that has one, assigns it to the slot, and performs bookkeeping. It may not find an appropriate task for a job, for example, because of rack affinity issues. That is why HFS relaxes fidelity to the precise dictates of the master allocation goals for a time. This is known as delay scheduling.

The tasks in the Map phase of a MapReduce job are predetermined because they involve fixed sized blocks of data stored on various disks local to the processors. However, the atomic units composed into tasks in the Reduce phase of a MapReduce job are the keys within the key-value pairs, and these keys can be combined into tasks arbitrarily. So the Reduce phase of MapReduce is an example in which the work includes highly data parallel independent tasks that can be created from small atomic units and need to be scheduled.

According to an embodiment of the present disclosure, a need exists for a flexible allocation scheme for highly independent data parallel tasks that improves the performance of the system. The performance will be improved both in the case of a single job, or, working synergistically with a scheduling scheme such as FAIR or FLEX, in the case of a plurality of jobs as well.

BRIEF SUMMARY

According to an embodiment of the present disclosure, a method for scheduling a data processing job includes receiving the data processing job comprising a plurality of computing units, combining the plurality of computing units into a plurality of sets of tasks, each set comprising tasks of about equal estimated size, and different sets having different sized tasks, and assigning the tasks to a plurality of processors using a dynamic longest processing time (DLPT) scheme.

According to an embodiment of the present disclosure, a system comprises a plurality of processors executing a data processing job in parallel according to a longest processing time (DLPT) scheme, wherein the data processing job comprises a plurality of computing units combined into a plurality of sets of tasks, each set comprising tasks of about equal estimated size, and different sets having different sized tasks.

According to an embodiment of the present disclosure, a method for scheduling a data processing job includes receiving the data processing job comprising a plurality of computing units, combining, iteratively, the plurality of computing units into a plurality of sets of tasks, each set comprising tasks of about equal estimated execution time, and each subsequent set having tasks of a smaller execution time, and assigning the tasks to the plurality of processors using a dynamic longest processing time (DLPT) scheme, wherein the DLPT receives a pipeline of the tasks as input in an order according the task size.

BRIEF DESCRIPTION OF THE SEVERAL VIEWS OF THE DRAWINGS

Preferred embodiments of the present disclosure will be described below in more detail, with reference to the accompanying drawings:

FIG. 1 is a flow diagram for the LPT scheme;

FIGS. 2A-B illustrate a potential solution to an LPT scheduling problem;

FIG. 3 is a flow diagram for the DLPT scheme taking an ALDPT type input according to an embodiment of the present disclosure;

FIG. 6 is a flow diagram of an ADLPT method according to an embodiment of the present disclosure.

FIG. 7 is a computer system for implementing a method according to an embodiment of the present disclosure.

DETAILED DESCRIPTION

Figure 4:
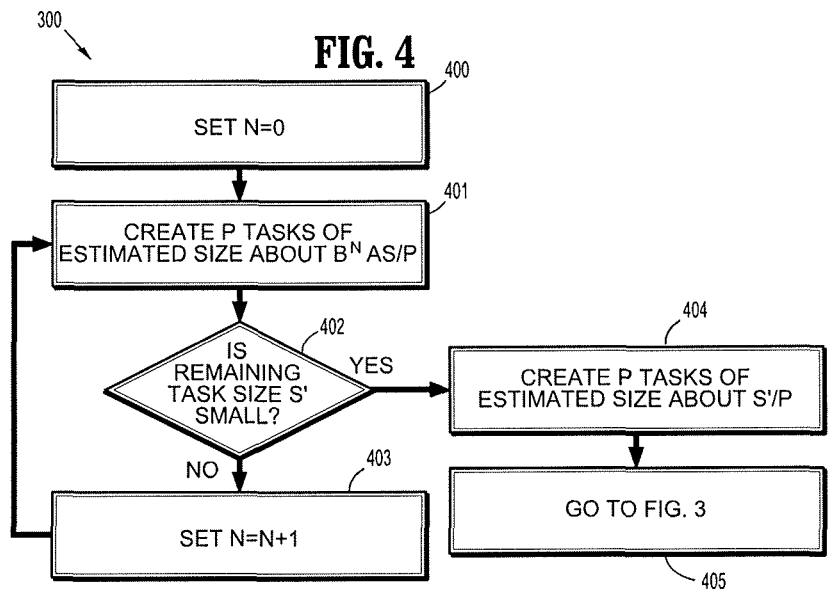
FIG. 4 is a flow diagram for the ALDPT scheme according to an embodiment of the present disclosure.

In the field of distributed computing, a distributable problems or jobs are divided into a number of highly data parallel tasks. The tasks may be created from smaller atomic units and can be scheduled on a plurality of processors. An exemplary scenario having these characteristics is the Reduce phase of a MapReduce job. MapReduce jobs are executed on a group of processor hosts, sometimes referred to as a cluster. In this case keys of key-value pairs represent the atomic units from which the tasks can be created. Atomic units are the smallest unit of computation for a task.

According to an embodiment of the present disclosure, the creation of the independent Reduce tasks is placed under the control of the scheduler. While MapReduce is a preferred embodiment of the present disclosure, it should be understood that methods described herein will work in any environment in which highly parallel independent atomic units can be composed into independent tasks to be scheduled on a plurality of processors.

According to an embodiment of the present disclosure, clusters of hosts are designed to support either single or multiple concurrent jobs. The scheduling scheme described herein is referred to as ADLPT (Assisted Dynamic Longest Processing Time first). According to an embodiment of the present disclosure, an ADLPT scheduler may be applied to MapReduce environments, but is not limited to such scenarios.

ADLPT can be described based on DLPT. DLPT, in turn, can be described based on LPT. The present disclosure describes each of these in reverse order.

Given a set of tasks of a single job to be scheduled on a plurality of processors, LPT can be described as shown in FIG. 1 and in the following pseudocode:

LPT Pseudocode

1: Order and re-index the tasks $T_1,...,T_n$ from largest to smallest estimated execution times, so that $e_1 >= ... >= e_n$(101)
2: Set the total execution times for the P processors to be $E_1=...=E_P=0$ (102)
3: for (t=1;t<=n;t++)
4:   Assign task t to the processor p for which $E_p$ is smallest (103)
5:   Reset $E_p=E_p + e_t$(104)
6: endfor (105)

LPT assigns the largest tasks first and the smallest tasks last. Accordingly, LPT heuristically balances the load on the various processors by assigning riskier, larger tasks at the first stages of the scheme, while evening out the load balance by assigning the safer, smaller tasks last. Here, risk is associated with the probability that the task will take a longer time to execute then other tasks in the job. While LPT does not always produce an optimal schedule, it has known performance guarantees and a good execution time.

FIGS. 2A-B illustrate a potential LPT solution. The tasks 201-209 are shown in FIG. 2A, sorted by decreasing estimated execution times. The LPT scheduling solution is shown in FIG. 2B. One can see from FIG. 2B how the tasks 201-209 are assigned to processors 210-212, and one can see an example of the effectiveness the LPT algorithm. Note that the last tasks (207, 208, 209) on each processor complete at about the same time, thus reducing the response time associated with the job. The overall response time is also known in this case as the "makespan."

LPT is an inherently static scheduling scheme. The execution times of tasks in computing systems are inherently stochastic in nature. Accordingly, a dynamic scheme will generally outperform a static scheme. Thus DLPT, by virtue of being dynamic, will typically perform at least as well as LPT. DLPT mimics LPT but is different precisely in its dynamic nature: DLPT orders and re-indexes the tasks $T_1,...,T_n$ from largest to smallest estimated execution times, so that $e_1 >= ... >= e_n$. It assigns the first task $T_1$ to processor p for which $E_p$ is smallest, as before. The assignment of task t involves waiting until a previous task to complete, for example, on processor p. Assigning task t to processor p is a dynamic improvement to the approach of statically assigning it to the processor with the smallest actual total execution time at the time. That is by definition, because it has completed its work.

In the case of the present disclosure the stochastic aspect of the problem can occur because of the heterogeneous processors, because of the complexity of the processors themselves, because of exogenous workloads and because of imperfect task execution time estimates. An exemplary DLPT scheme taking ADLPT input is given in FIG. 3 and the following pseudocode:

DLPT Pseudocode

1: Order and re-index the tasks $T_1,...,T_n$ from largest to smallest estimated execution times, so that $e_1 >= ... >= e_n$(301)

| DLPT Pseudocode |
|---|
| 2: for (t=1;t<=n;t++) (302, 305, 306)<br>3.    Wait until the first processor p completes the previous task (303)<br>4:    Assign task t to the processor p (304)<br>5: endfor (307) |

DLPT has excellent performance on common problem instances. Creating tasks of intentionally equal estimated execution times is standard operating procedure.

According to an embodiment of the present disclosure, ADLPT (see FIG. 4) introduces tasks of unequal execution time estimates at block 300 of FIG. 3 and improves on the performance of the DLPT scheme. While the methods herein are described in terms of a preferred embodiment of the Reduce phase of a MapReduce job, those with skill in the art will recognize that ADLPT applies to any environment consisting of highly independent data parallel tasks that can be created from smaller atomic units and scheduled on a plurality of processors.

Figure 5:
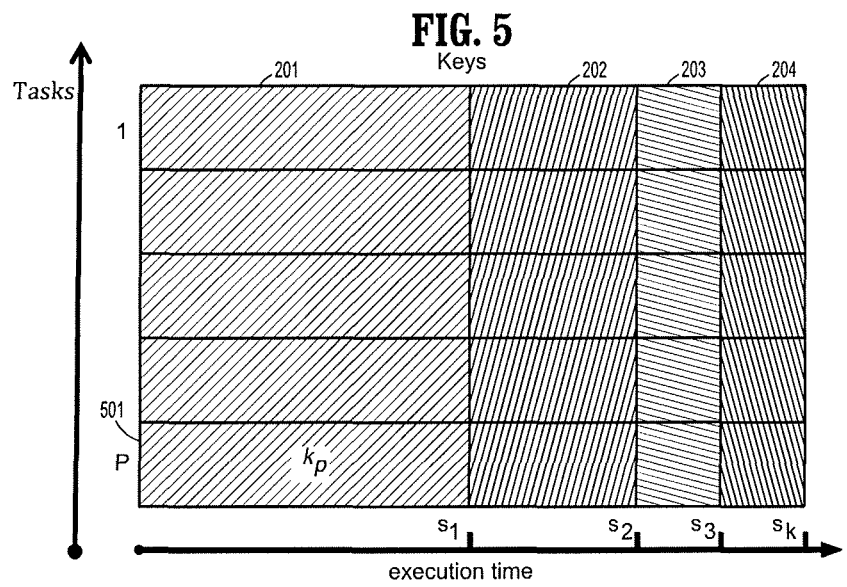
FIG. 5 is an exemplary ALDPT block geometric design according to an embodiment of the present disclosure.

In the case of the Reduce phase of a MapReduce job, the atomic units are described in terms of keys. Referring to FIGS. 4 and 5, suppose there are K keys of estimated execution times $s_k$ and assume that $s_k=1$ if no estimates are available. In a preferred embodiment, referred to as Block Geometric Design, a total estimated execution time S may be determined as $S=\Sigma s_k$.

Using two parameters A and B, both are chosen to be less than 1, a first set of P tasks (201) is created having estimated execution times AS/P that are about equal by choosing sufficient keys 1 to $k_1$ until $$\sum_{1}^{k_1} s_k$$

exceeds AS/P, then choosing sufficient keys $k_1+1$ to $k_2$ until $$\sum_{1}^{k_1} s_k$$

exceeds 2AS/P, and so on through P tasks (401). This is the first block of P tasks (201), ending with key $k_P$ 501. The total estimated execution time of the first block of P tasks (201) is approximately AS.

A next set of P tasks (202) is created of approximately equal estimated execution times BAS/P, by choosing sufficient keys $k_P+1$ to $k_{2P}$ until $$\sum_{k_P+1}^{k_{2P}} s_k$$

exceeds BAS, appropriately subdivided into P tasks based on keys so that the individual sums are approximately BAS/P.

According to the example shown in FIG. 5, a new set of P tasks (203) is created of approximately equal estimated execution times $B^2$ AS/P, with additional sets created until a stopping criteria (402) with an $N^{th}$ step (where N has an initial value of 0 (400) and is incremented for each set of P tasks (403)), where a final set of P (small) tasks (204) is created after the $N^{th}$ step (404). Here, the stopping criteria (402), e.g., "small", corresponds to a set of up to P tasks remaining for a current decomposed job, these tasks are necessarily smaller than the previous set of tasks (e.g., 203 in the example).

FIG. 5 depicts the resulting tasks of unequal size. N should be chosen so that either all keys are included or the overhead associated with the tasks becomes comparable to their estimated execution times.

These are the (N+1)P tasks that are input by ALDPT to the DLPT scheme at block 300 (see also block 405 in FIG. 4). In a preferred embodiment a pipelined approach can be set up between the Map and Reduce phases, so that new tasks are sent via the network as the previous tasks are nearing completion. This just-in-time approach has the cost of making the assignment decisions slightly less dynamic, but the benefit of avoiding waiting for the data to arrive at the Reduce task.

The present disclosure has advantages in systems where multiple jobs are present as well. Consider, for example, a MapReduce environment where a scheduling allocator such as FAIR or FLEX attempts to optimize the allocation of slots in processors to multiple jobs. Any metric used to evaluate the quality of the schedule will depend on the completion time of each job, and the completion time of each job is defined to be the completion time of the last task in the job. In view of the foregoing, the completion time of the last job may be improved, and therefore will have the affect of aiding such a scheduling allocator. In other words, for example, ADLPT works synergistically with schemes such as FAIR or FLEX.

In view of the forgoing, referring to FIG. 6, a method for scheduling a large-scale data processing job includes receiving the job comprising a plurality of parallel independent atomic computing units 601, combining the plurality of computing units into a plurality of tasks with decreasing estimated sizes over time 602, determining a total number of the plurality of tasks for the job 603, and assigning the plurality of tasks to a plurality of processors using a longest processing time (DLPT) scheme 604. In a MapReduce framework, the method can reduce a response time of a reduce phase of the job, a response time of a map and a response time of a merge phase of a merge sort.

As will be appreciated by one skilled in the art, aspects of the present disclosure may be embodied as a system, method or computer program product for a flexible allocation scheme for data parallel tasks. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 7, according to an embodiment of the present disclosure, a computer system 701 for implementing a flexible allocation scheme for data parallel tasks can comprise, inter alia, a central processing unit (CPU) 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include random access memory (RAM), read only memory (ROM), disk drive, tape drive, etc., or a combination thereof. Embodiments of the present disclosure can be implemented as a routine 707 that is stored in memory 703 and executed by the CPU 702 to process the signal from the signal source 708. As such, the computer system 701 is a general-purpose computer system that becomes a specific purpose computer system when executing the routine 707 of the present disclosure.

The computer platform 701 also includes an operating system and micro-instruction code. The various processes and functions described herein may either be part of the micro-instruction code or part of the application program (or a combination thereof) that is executed via the operating system. In addition, various other peripheral devices may be connected to the computer platform such as an additional data storage device and a printing device.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described embodiments for a flexible allocation scheme for data parallel tasks, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable storage medium embodying instructions executed by a processor to perform a method for scheduling a data processing job, the method comprising:

receiving the data processing job comprising a plurality of atomic processing tasks;

combining the plurality of atomic processing tasks into a plurality of sets of tasks, each set of tasks comprising atomic processing tasks of about equal estimated processing times, and different sets of tasks having different combined estimated processing times;

assigning each of the sets of tasks to a plurality of processors using a dynamic longest processing time (DLPT) scheme by which sets of tasks having longest combined estimated processing times are assigned to the plurality of processors and assignment to the processor is performed dynamically as the processor completes the set of atomic processing tasks; and determining and reporting a maximum number of available processors P to assign to the data processing job, wherein each of the plurality of sets of tasks comprises P atomic processing tasks, and wherein in combining the plurality of atomic processing tasks into a plurality of sets of tasks, the processor computes two parameters A and B, wherein A and B define a proportion of a total execution time of the data processing job devoted to the processing of each of the plurality of sets of tasks, and A and B are each less than 1 and greater than 0.

2. The computer readable storage medium of claim 1, wherein each of the plurality of sets of tasks, except for a set of tasks having smallest estimated processing times, comprises P atomic processing tasks.

3. The computer readable storage medium of claim 1, further comprising creating a first set of P atomic processing tasks having a total estimated execution time for the first set AS, where S is the total execution time of the data processing job.

4. The computer readable storage medium of claim 3, further comprising creating a second set of P atomic processing tasks having a total estimated execution time for the second set BAS.

5. The computer readable storage medium of claim 1, further comprising creating a number of sets of the tasks that combines all atomic processing tasks of the data processing job.

6. The computer readable storage medium of claim 1, further comprising creating a number of sets of tasks wherein an overhead associated with processing each of the atomic processing tasks is proportional to their estimated execution times.

7. A system comprising a plurality of processors executing a data processing job in parallel, wherein the data processing job comprises a plurality of atomic processing tasks combined into a plurality of sets of tasks, each set of tasks comprising atomic processing tasks of about equal estimated processing times, and different sets of tasks having different combined estimated processing times, wherein execution of the data processing jobs in parallel is performed in accordance with a dynamic longest processing time (DLPR) scheme by which sets of tasks having longest combined estimated processing times are assigned to the plurality of processors and assignment to the processor is performed dynamically as the processor completes the set of atomic processing tasks, and wherein a maximum number of available processors P to assign to the data processing job is determined and reported, wherein each of the plurality of sets of tasks comprises P atomic processing tasks, and wherein in combining the plurality of atomic processing tasks into a plurality of sets of tasks, the processor computes two parameters A and B, wherein A and B define a proportion of a total execution time of the data processing job devoted to the processing of each of the plurality of sets of tasks, and A and B are each less than 1 and greater than 0.

8. The system of claim 7, wherein the number of processors is equal to the number of atomic processing tasks in each set of tasks.

9. A non-transitory computer readable storage medium embodying instructions executed by a scheduling processor to perform a method for scheduling a data processing job, the method comprising:

receiving the data processing job comprising a plurality of atomic processing tasks;

combining, iteratively, the plurality of atomic processing tasks into a plurality of sets of tasks, each set of tasks comprising atomic processing tasks of about equal estimated execution time, and each subsequent set of tasks having atomic processing tasks of a smaller execution time;

assigning the sets of tasks to the plurality of processors using a dynamic longest processing time (DLPT) scheme executing on the scheduling processor, wherein the scheduling processor receives a pipeline of the atomic processing tasks as input in an order according the combined estimated processing time of each set of tasks; and determining and reporting a maximum number of available processors P to assign to the data processing job, wherein each of the plurality of sets of tasks comprises P atomic processing tasks, and wherein in combining the plurality of atomic processing tasks into a plurality of sets of tasks, the processor computes two parameters A and B, wherein A and B define a proportion of a total execution time of the data processing job devoted to the processing of each of the plurality of sets of tasks, and A and B are each less than 1 and greater than 0, wherein the DLPT scheme assigns atomic processing tasks having longest estimated processing times to the plurality of processors and assignment to the processor is performed dynamically as the processor completes the set of atomic processing tasks.

10. The computer readable storage medium of claim 9, wherein each of the plurality of sets of tasks, except for a set of tasks having smallest estimated processing times, comprises P atomic processing tasks.

11. The computer readable storage medium of claim 9, further comprising creating a first set of P atomic processing tasks having a total estimated execution time for the first set AS, where S is a total execution time of the data processing job.

12. The computer readable storage medium of claim 11, further comprising creating a second set of P atomic processing tasks having a total estimated execution time for the second set BAS.

13. The computer readable storage medium of claim 9, further comprising creating a number of sets of tasks that combines all atomic processing tasks of the data processing job.

14. The computer readable storage medium of claim 9, further comprising creating a number of sets of tasks wherein an overhead associated with processing each of the atomic processing tasks is proportional to their estimated execution times.

15. A method for scheduling a data processing job, using a scheduling processor, comprising:

receiving the data processing job comprising a plurality of atomic processing tasks;

combining, iteratively, the plurality of atomic processing tasks into a plurality of sets of tasks, each set of tasks comprising atomic processing tasks of about equal estimated execution time, and each subsequent set of tasks having atomic processing tasks of a smaller execution time;

assigning the sets of tasks to the plurality of processors using a dynamic longest processing time (DLPT) scheme executing on the scheduling processor, wherein the scheduling processor receives a pipeline of the atomic processing tasks as input in an order according the estimated processing time of each set of tasks; and determining and reporting a maximum number of available processors P to assign to the data processing job, wherein each of the plurality of sets of tasks comprises P atomic processing tasks, and wherein in combining the plurality of atomic processing tasks into a plurality of sets of tasks, the processor computes two parameters A and B, wherein A and B define a proportion of a total execution time of the data processing job devoted to the processing of each of the plurality of sets of tasks, and A and B are each less than 1 and greater than 0, wherein the DLPT scheme assigns sets of tasks having longest combined estimated processing times to the plurality of processors and assignment to the processor is performed dynamically as the processor completes the set of atomic processing tasks.

* * * * *